(No Model.)
J. B. HYDE.
FLOATING BREAKWATER FOR HARBORS OF REFUGE AND TO PROTECT SHORES FROM SEA WAVE DESTRUCTION.
No. 307,393. Patented Oct. 28, 1884.
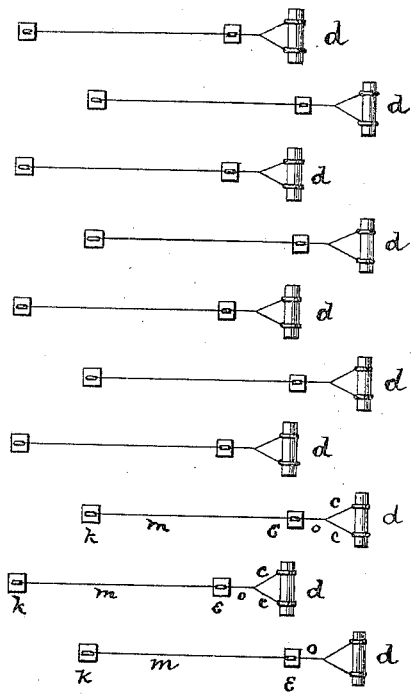
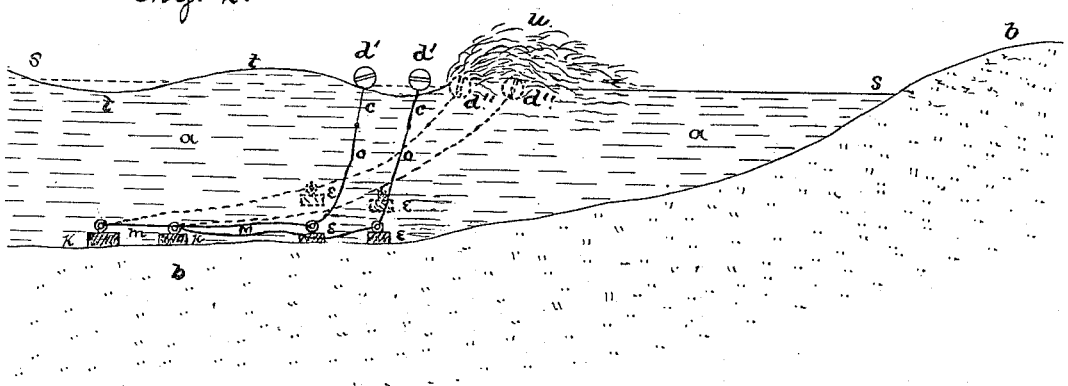
WITNESSES:
INVENTOR:
J Burrows Hyde
BY
O. E. Duffy
ATTORNEY.
N. PETERS. Photo-Lithographer, Washington, D. C.

United States Patent Office.

J. BURROWS HYDE, OF NEW YORK, N. Y.

FLOATING BREAKWATER FOR HARBORS OF REFUGE AND TO PROTECT SHORES FROM SEA-WAVE DESTRUCTION.

SPECIFICATION forming part of Letters Patent No. 307,393, dated October 28, 1884.

Application filed December 11, 1883. (No model.)

*To all whom it may concern:*

Be it known that I, J. BURROWS HYDE, a citizen of the United States of America, residing at New York, in the county of New York and State of New York, have invented certain new and useful Improvements in Floating Breakwaters for Harbors of Refuge and to Protect Shores against Sea-Wave Destruction, of which the following is a specification, reference being had therein to the accompanying drawings.

My invention relates to a novel device for protecting coast-shores against wave-washings, also for harbors of refuge or safety, by floating breakwaters, designed to be so placed as to intercept and break down heavy sea-waves before they reach the shore or the object or area to be protected.

My improvement consists in interposing buoyant media that, while floating freely on the surface of the water, are so anchored that they will yield to and travel with an advancing wave, the force of which will be gradually resisted until the float, by passing under the wave, will trip and cause it to fall with its power neutralized before it can reach the object to be protected. (See drawings.)

Figure 1 shows a plan or surface view of the water with shore-line, and Fig. 2 a vertical section through the same.

$a$ represents the water, $b$ the shore and the bottom. $d\ d$ are float-timbers of proper buoyancy, preferably about twenty-five feet long and twenty inches diameter, encompassed by iron straps provided with strong loops or rings, which take a hook on each end of a bridle, $c$, of wire, rope, or chain, say thirty feet long. To the middle of this bridle a ring or hook attaches to a second chain or rope, $o$—say twenty feet long—at the outer end of which a strong hook takes a staple fixed to a spring-anchor, $e$, to which the cable proper, $m$, is also hooked, and to the outer or extreme end of this cable the holding-anchor $k$ is secured. In the plan two rows of floats are shown anchored—say fifty feet apart—both endwise and transversely. The anchors may be of stone blocks, and $k$ should be at least twice the weight of $e$. The length of the main cable $m$ should not for ordinary shelving-shore depths be less than seventy-five feet.

In the vertical drawing, $s$ and $d'$ represent the surface of the water and floats, as in calm weather, the spring cable and bridle in nearly a vertical line, and the anchors at rest on the bottom. $t\ t$ show the water-surface as undulated by a wave motion, and the floats at $d''\ d''$ as forced inshoreward by the wave, the cables and spring-anchor being all shown by dotted lines as carried forward thereby.

The action of the apparatus is as follows: As the waves roll in the first line of floats will be forced inshore until the strain on the spring-cable raises its anchor, then, if the force be sufficient, the main cable will be lifted and extended until it will no longer yield to the wave, which must then break upon the float by its base being tripped, and consequently fall, but be partly divided, one portion being deflected to the right and the other to the left, which sections will travel on until they meet the second line of float, where the process being repeated, the wave is destroyed, and smooth water left inside as the floats and cables fall back to their first position. The effect of breaking the wave is shown at $u$, Fig. 2.

The shape of the floats may be varied; but I prefer them to be cylindrical, of wood or sheet-iron.

What I claim as my invention is—

1. In apparatus for protecting shores and other property from wave-washings, the buoys or floats $d$, secured to the fixed anchors $k$ by the cables $m$, and having intermediate spring-anchors, $e$, with check-cables $o$, and bridles $c$, each arranged substantially in the manner and for the purpose set forth.

2. In a floating buoy for protecting shores from wave-washings, the combination, with the floats $d$, cables $m$, and fixed anchors $k$, of the spring-anchors $e$, located intermediate of said floats and fixed anchors, substantially in the manner and for the purpose set forth.

In testimony whereof I affix my signature in presence of two witnesses.

J. BURROWS HYDE.

Witnesses:
GERARD C. GREEN,
EDWARD E. ELLIS.